United States Patent [19]

Multon et al.

[11] 4,202,210
[45] May 13, 1980

[54] ULTRASONIC FLOW METER FOR GASES

[75] Inventors: François Multon, Les Mureaux; Gerard Allain, Andresy, both of France

[73] Assignee: Ultraflux, France

[21] Appl. No.: 893,738

[22] Filed: Apr. 5, 1978

[30] Foreign Application Priority Data

Jan. 6, 1978 [FR] France .................. 78 00845

[51] Int. Cl.² .................................. G01F 1/66
[52] U.S. Cl. .................................. 73/194 A
[58] Field of Search .......................... 73/194 A

[56] References Cited

U.S. PATENT DOCUMENTS

| | | | |
|---|---|---|---|
| 3,727,458 | 4/1973 | Parkinson | 73/194 A |
| 3,982,435 | 9/1976 | Harned | 73/194 A |
| 4,028,938 | 6/1977 | Eck | 73/194 A |
| 4,052,896 | 10/1977 | Lee et al. | 73/194 A |
| 4,069,713 | 1/1978 | Gassmann | 73/194 A |

Primary Examiner—Charles A. Ruehl
Attorney, Agent, or Firm—William A. Drucker

[57] ABSTRACT

Apparatus, for measuring the velocity of flow of a gas, is of the type comprising two ultrasonic probes arranged opposite to one another and transmitting pulses following upstream and downstream paths which are inclined with respect to the direction of flow. A commutation device which enables these two paths to be established is actuated in such a way as to effect changeover of the probes both on transmission and on reception, the commutation command signals being phase shifted with respect to the transmission pulses.

2 Claims, 2 Drawing Figures

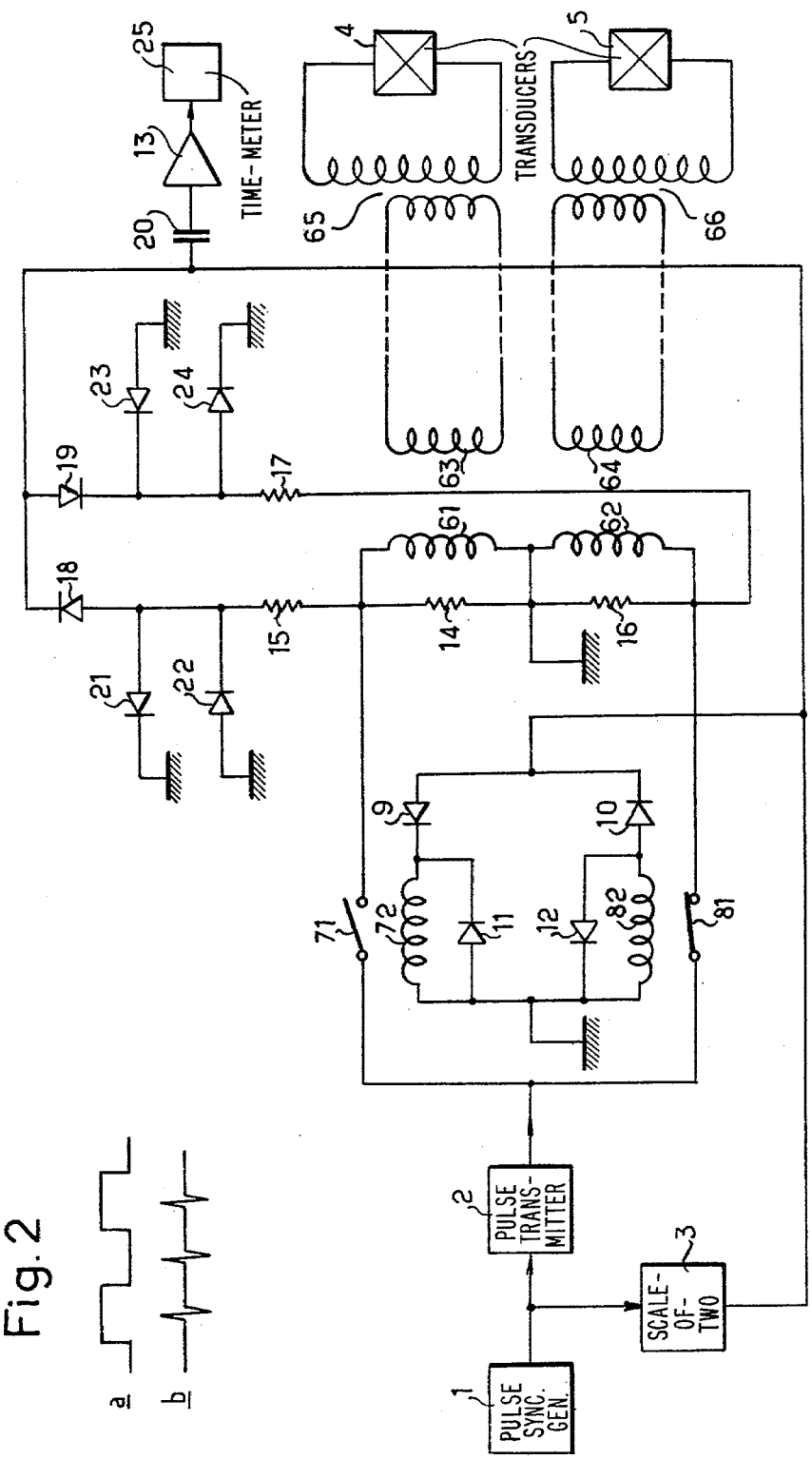

ULTRASONIC FLOW METER FOR GASES

The invention relates to apparatus for the measurement of flow by the transmission of ultrasonic pulses following a path oblique with respect to the direction of flow and for measuring the difference between the upstream and downstream propagation times along said path.

BACKGROUND OF THE INVENTION

This type of apparatus is at present utilized for measuring the velocity of flow of a liquid. Although in theory the same procedure could be applied to gases, up to the present no satisfactory industrial equipment has been produced for this application.

SUMMARY OF THE INVENTION

The present inventors have discovered that equipment using the above procedure is suitable for the measurement of the velocity of flow in a gas provided that it includes the following features:

(a) The frequency of the acoustic waves transmitted in pulses is of the order of one to several hundred kilohertz, according to the diameter of the conduit in which the gas flows.

(b) The coupling between the electrical oscillator and the transducers transmitting the ultrasonic pulses is effected by means of an impedance transformer.

(c) The electrical oscillator generates considerable peak power, corresponding to potentials of the order of one to several hundred volts and to currents of several amperes and the commutation device needed to set up the two directions of propagation, upstream and downstream, is conceived and designed for supporting such a large peak power.

Among the known solutions in the domain of flow measurement of a liquid, preference will be given, in the application to gases, to that in which two transducers coupled by the fluid in movement are arranged opposite to one another, a single transmitter and a single receiver of pulses being coupled to these transducers, and a switching device through which the two transducers can be connected alternately to the receiver during successive transmission cycles. In prior art devices each of the two transducers transmits a pulse at the same instant which will be received by the other after having traversed the fluid, at moments displaced in time, the measurement of the displacement giving an indication of the velocity of flow. The change-over, being effected solely on received pulses having a relatively small amplitude, can be effected by means of diodes opened by a square-wave signal obtained by dividing by two the frequency of the transmitter synchronization signal.

This known solution only functions correctly when the transducers are sufficiently damped so that the parasitic oscillations of the pulse transmitted by each transducer do not interfere with reception of the pulse coming from the opposite transducer. This damping is obtainable in equipment for the measurement of flow of a liquid in which the central pulse frequency is of the order of one to several MHz.

On the other hand if it is desired to apply this type of apparatus to the measurement of the output of a gas, the much lower frequencies mentioned above must be used having regard to the fact that the absorption of ultrasonic waves in the gas is much greater than in liquids. It results that the signal transmitted by the probe has a large duration and, consequently, simultaneous transmission by the two transducers is no longer a satisfactory method.

According to a preferred mode of carrying out the invention, the commutation device is of such a type that at each cycle of transmission only one of the transducers is connected to the transmitter, the other transducer being connected to the receiver.

Preferably the commutation device is driven by a square-wave signal phase-shifted with respect to the transmission pulses.

According to a preferred embodiment, the commutation device comprises electro-magnetic relays which ensure the change-over of the connection between transmitters and transducers.

Other features and advantages of the present invention will be apparent from the following description with reference to the accompanying drawing.

BRIEF DESCRIPTION OF THE DRAWINGS

In the drawing:

FIG. 1 is a circuit of a flow-measuring set comprising a commutation device in accordance with a preferred form of the invention and FIG. 2 shows the transmission pulses and the commutation signals.

DESCRIPTION OF THE PREFERRED EMBODIMENT

The apparatus comprises, in known manner, a synchronization generator 1 connected to a pulse transmitter 2 and to a circuit 3 which includes a frequency divider and generates a square-wave signal of a frequency equal to half the repetition frequency of the pulses.

According to a feature of the invention, the circuit 3 is driven in such a way that the commutation signal (wave-form $a$ FIG. 2) is phase-shifted with respect to the transmission pulses (wave-form $b$ FIG. 2), each of the edges, front and back, of each positive or negative half-wave coinciding for example with the centre of the interval which separates two successive pulses.

The coupling between the transmitter 2 and the transducers 4 and 5 is effected by means of two separate transformers 61–63 and 62–64. The common point of the primary windings 61 and 62 is grounded, the secondary windings 63 and 64, coupled respectively to the primary windings 61 and 62, excite the transducers 4 and 5 respectively, by means of transformers 65 and 66 respectively. The latter are positioned near the corresponding transducer and enable the potential at its terminals to be increased and the impedance of the ceramic to be matched to that of the connecting cable.

Naturally account has been taken of the features $a$ and $c$ mentioned above. By way of example, for a conduit of 1 m. diameter a transmission frequency of 300 kHz will be chosen. If the frequency is too high the absorption in the gas would be such that the received power would be insufficient. If the frequency is too low the edges of the acoustic pulses would not be sufficiently steep to enable the propagation times to be measured with a satisfactory accuracy. In order to take absorption into account, the peak voltage of the pulses must lie for example between 200 and 500 volts, according to the diameter of the conduit.

The connection between transmitter 2 and the primary windings 61 and 62 is effected through the respective contacts 71 and 81 of the two electro-magnetic relays the windings 72 and 82 of which receive the commutation signal in parallel through diodes 9 and 10 respectively. Diode 9 is connected in such a direction as to transmit positive half-waves, while diode 10, connected in the opposite direction, transmits the negative half-waves. Diodes 11 and 12, connected in the opposite direction to diodes 9 and 10 across the terminals of the respective coils 72 and 83, enable excess voltages to be avoided.

The coupling between transducers 4 and 5 and the receiver 13 of the apparatus is effected by means of windings 63-61 and 64-62 respectively, resistances 14-15, and 16-17, and diodes 18 and 19. The series circuits formed on the one hand by the resistance 15 and the diode 18, and on the other hand by the resistance 17 and the diode 19, connected in the opposite direction to the diode 18, are connected in parallel between the connecting capacitor 20 on the receiver 13 (point of application of the commutation signal) and the "hot points" of the respective windings 61 and 62. Pairs of auxiliary diodes 21-22 and 23-24 connected in opposite directions respectively, connect the common points of resistance 15 and diode 18 on the one hand, and of the resistance 17 and diode 19 on the other hand. These auxiliary diodes are intended to limit the signals transmitted to the receiver in order to suppress remaining portions of the transmission pulses.

During the positive half-cycle of the commutation signal diode 9 is conducting so that the contact 71 closes and the transducer 4 is excited by the transmission pulse which coincides with the centre of the positive half-cycle. Diode 10 is not conducting and, the contact 81 being open, the transducer 5 is not excited.

The pulse transmitted by the transducer 4 is received by the transducer 5 after propagation through the gas, the velocity of flow of which is to be measured, at a moment before the end of the positive half-wave in question. At this moment diode 19 is therefore conducting while diode 18 is blocked. The negative portion of the signal received by the transducer 5 is therefore transmitted to the receiver through the resistance 17 and the diode 19. The received signal not being of sufficient amplitude to block the diode 19, is transmitted in its entirety to the receiver.

What remains of the signal transmitted by the transducer 4 which is present on the winding 61 at the moment of reception passes through the diodes 21-22 and does not reach the receiver, diode 18 being blocked.

During the negative half-wave which follows diodes 10 and 18 are now conducting, so that the transducer 5 transmits a pulse which is received after propagation by the transducer 4 and applied to the receiver.

As in prior art devices of the same kind, a device 25 effects the measurement of the difference between the propagation times of the transducer 4 to the transducer 5 and of the transducer 5 to the transducer 4 respectively.

The time lag between the commutation signals and the transmission synchronization pulses (which is not necessarily equal to a half transmission period) is a matter of considerable interest. In fact, having regard to the power of the transmitted signal and to the speed of commutation, it is not possible to utilize the static type of device which can neither interrupt nor transmit these powers. On the contrary, commutation is possible with electromagnetic relays; but in order to avoid the use of large relays and to shorten their life duration it is distinctly preferable to effect commutation at a different moment from that of transmission.

It is obvious that various modifications can be made to the commutation device which has been described and illustrated, without departing from the scope of the invention as defined in the appended claims.

Use could be made of two separate transmitters each directly connected by an impedance-matching transformer to each of the two respective transducers, the latter being coupled to a single receiver by a diode commutation device of the type described above or coupled to two separate receivers. The commutation of the transducers during transmission would then be made by triggering each transmitter during a synchronization pulse out of two, i.e. by connecting them to a common synchronization generator through a commutator. This commutator, working at low level, could then be of the static type.

This solution is obviously inferior to that which has been described in detail and illustrated. In fact the propagation times of the pulses in the two connecting circuits between the transmitters and the transducers and possibly in the commutation circuits between transducers and receivers, can differ from one another and cause an interference which falsifies the measurement of the propagation times in the fluid. However, when the latter is a gas the velocity of propagation of the ultrasonic waves is about five times less than in liquids and the differences in the propagation time to be measured are themselves twenty-five times greater, so that the effect of the error mentioned may in certain cases be neglected.

We claim:

1. An apparatus for measuring fluid flow in a passage, said apparatus comprising: first and second transducers respectively having first and second transmitting-receiving surface portions, coupled to the passage, said first and second surface portions being parallel and facing one another; pulse generator means generating recurrent pulses at a predetermined repetition frequency; an electric pulse transmitter coupled to said pulse generator means; square-wave signal generator means, coupled to said pulse generator means, for generating a square-wave signal having a frequency equal to half the said repetition frequency, said square-wave signal alternately having positive and negative half-periods; first switching means, controlled by the said square-wave signal, for coupling the said pulse transmitter to the first transducer during the said positive half-periods and to the second transducer during the said negative half-periods, whereby a first acoustic pulse is propagated across the fluid passage from the first transducer to the second transducer during each of said positive half-periods and a first electric pulse is generated at a first time when the said first acoustic pulse reaches the second transducer, while a second acoustic pulse is propagated across the fluid passage from the second transducer to the first transducer during each of said negative half-periods and a second electric pulse is generated at a second time when the said second acoustic pulse reaches the first transducer, the apparatus further comprising: electric pulse receiver means having an input and an output; further switching means, controlled by the said square-wave signal, for coupling the second transducer to the input of the pulse receiver means during the positive half-periods and for coupling the first transducer to the input of the pulse receiver means during the negative half-periods; and means, connected to the output of the pulse receiver means, for measuring the time interval between the first and second times, wherein said first switching means comprise first and second electromagnetic relay means respectively having first and second control coils and first and second diodes connecting said respective control coils to the said square-wave signal generator means, said first and second diodes being connected in opposite directions to one another.

2. An apparatus as claimed in claim 1, wherein the said first and second electromagnetic relay means have first and second switchable contacts, the apparatus further comprising first and second transformers each having a primary winding and a secondary winding, the primary winding of the first transformer connecting the first contact to the earth and the primary winding of the second transformer connecting the second contact to the earth; third and fourth transformers each having a primary winding and a secondary winding, the primary winding of the third transformer being connected to the secondary winding of the first transformer and the primary winding of the fourth transformer being connected to the secondary winding of the second transformer, the secondary winding of the third transformer being connected to the first transducer and the secondary winding of the fourth transformer being connected to the second transducer; and the said further switching means include third and fourth diodes respectively connecting the primary winding of the respective first and second transformers to the input of the pulse receiver means, said third and fourth diodes being connected in opposite directions to one another.

* * * * *